United States Patent [19]

Luckey

[11] 3,778,615

[45] Dec. 11, 1973

[54] MIXED ALKALINE EARTH SULFATE PHOSPHOR FLUORESCENT SCREENS AND RADIOGRAPHIC ELEMENTS

[75] Inventor: George W. Luckey, Rochester, N.Y.

[73] Assignee: Eastman Kodak Company, Rochester, N.Y.

[22] Filed: May 18, 1971

[21] Appl. No.: 144,673

Related U.S. Application Data

[62] Division of Ser. No. 868,224, Oct. 21, 1969, Pat. No. 3,650,976.

[52] U.S. Cl. ......... 250/475, 252/301.4, 250/484
[51] Int. Cl. ............................................. H01j 1/62
[58] Field of Search ......... 250/80; 252/301.1, 301.4

[56] References Cited
UNITED STATES PATENTS

| | | | |
|---|---|---|---|
| 3,527,710 | 9/1970 | Toma et al. | 250/80 |
| 1,166,569 | 1/1916 | Wright | 250/80 |
| 2,306,626 | 12/1942 | Huniger | 252/301.4 R |
| 2,590,411 | 3/1952 | Isenberg | 252/301.4 R |
| 3,595,802 | 7/1971 | Blasse | 252/301.4 R |

Primary Examiner—Harold A. Dixon
Attorney—William M. J. Kline et al.

[57] ABSTRACT

Novel phosphors comprising lanthanide-activated plural mixed alkaline earth sulfates such as europium-activated strontium barium sulfate, are prepared by coprecipitation of the lanthanide ion and said plural alkaline earth ions in dilute solution. The phosphors show high efficiency of fluorescence when excited by x-rays and are particularly useful in intensifying screens in combination with radiographic image recording elements.

4 Claims, No Drawings

MIXED ALKALINE EARTH SULFATE PHOSPHOR FLUORESCENT SCREENS AND RADIOGRAPHIC ELEMENTS

This is a divisional application of parent application Ser. No. 868,224, filed Oct. 21, 1969, now U.S. Pat. No. 3,650,976.

BACKGROUND OF THE INVENTION

1. Field of the Invention

This invention relates to fluorescent materials highly suitable for radiography. In one aspect, this invention relates to new fluorescent compositions and methods for their preparation, said compositions being useful in intensifying screens for medical radiography. In another aspect, this invention relates to radiographic intensifying screens incorporating the novel phosphors. In still another aspect, this invention relates to combinations of an x-ray intensifying screen incorporating the phosphor materials and an image recording element comprising silver halide layers.

2. Description of the Prior Art

In the radiographic art, intensifying screens are used in order to diminish the time of exposure of an object in producing its image in a radiographic silver halide element. These intensifying screens comprise, in layer form, phosphors, i.e., substances which fluoresce upon exposure to x-rays or gamma rays. Typical phosphors used in the preparation of radiographic intensifying screens include zinc sulfide, magnesium tungstate, calcium tungstate, barium lead sulfate and the like.

The effect and desirability of various phosphor-containing screens can be measured in part by comparing their light intensity, speed and efficiency. Substantial efforts have been made in the past to obtain phosphors which have a high degree of brightness on excitation but little after glow.

Physical mixtures of certain other phosphors such as calcium and strontium sulfide and less than 50 percent by weight of calcium and strontium sulfate which can be activated by two rare earths, have already been disclosed in British Pat. No. 650,459 issued Feb. 28, 1951 (Urbach et al). These phosphors are stimulated by infrared radiation. Similarly, others have sought to mix alkaline earth halides sulfides and silicates which in turn are activated by rare earths such as europium, as taught in U.S. Pat. Nos. 3,163,608 issued Dec. 29, 1964 to Yocum and 2,522,074 issued Sept. 12, 1950, to Urbach et al. While still others have disclosed certain mixed alkaline earth sulfate phosphors, none has disclosed the novel rare earth activated mixed alkaline earth sulfate phosphors which are the subject of the present invention. In sharp contrast to the present invention prior attempts at mono- substitution of barium for example, for strontium or calcium in known divalent-europium activated calcium or strontium pyrophosphates, produced a gradual decrease in brightness. In fact, when the substitution was at only 60 percent, virtually no luminescence appeared. See Wanmaker and Ter Vrugt, Philips Research Reports, 22, 355–366 (1967).

Consequently, it is believe that it would not be obvious for those skilled in the art to attempt to provide such a mixed phosphor comprising a lanthanide activated plural mixed alkaline earth sulfate which is dramatically more intense and possessed of high speeds.

Further, while the use in the past of some highly efficient, i.e., intense, phosphor screens for radiography has been achieved in some cases in virtually all such cases the problem of substantial light diffusion both in the phosphor and in the photographic film layers has made desirable, the inclusion of light absorbing materials and dyes in order to increase sharpness. The necessity and presence of such dyes and light absorbers invariably leads to complicated steps of bleaching, washing or otherwise removing said materials whose colors may seriously interfere with the clarity or sharpness of the formed image.

It is highly unexpected that my novel phosphors described hereafter would exhibit such a vast increase in speed as compared to seemingly similar and customarily used phosphors. Further, the novel mixed alkaline earth phosphors exhibit a characteristic and particularly desirable spectral emission band whose intensity and spread make unnecessary the addition of dyes or light absorbers in order to reduce crossover-exposure and to increase image sharpness. Further, I have unexpectedly found that, as compared to known lanthanide-activated metal phosphors such as europium activated barium sulfate, my novel mixed phosphors require less of the expensive activating rare earth in exhibiting their marked increase in screen efficiency.

The mixed novel phosphors described herein are unexpectedly able to convert high energy radiation or ultraviolet energy to substantially monochromatic near ultraviolet radiation with high efficiency. This conversion by said novel phosphors of energy to light within a spectral range from about 425 nm to about 350 nm makes possible their use in a variety of ways such as, for example, as sensitizers of photochemical reactions as sources of monochromatic radiation or in image intensifying tubes for example.

Further, by employing the novel phosphors herein, it is now possible to utilize their unexpected narrow and intense spectral emission band in order to simply control the optical relationships which exist in a radiographic film screen-processing system without having to depend exclusively upon the further addition of a phosphor screen dye or other absorbers for example.

SUMMARY OF THE INVENTION

In accordance with this invention, there are provided novel lanthanide-activated alkaline earth sulfate phosphors, which exhibit marked light intensity and speed when excited by radiation. Said novel phosphors are prepared by a variety of processes and find particular utility when incorporated in intensifying screens for medical radiography. These screens, comprising a support can be combined in use or manufacture with an image-recording element comprising sensitive layers.

It is an object of this invention to provide new phosphors having improved properties over those previously known phosphors and processes for their preparation.

It is another object of this invention to provide improved intensifying screens for radiography comprising said phosphors.

It is still another object of this invention to provide novel radiographic elements comprising an intensifying screen comprising a mixed alkaline earth sulfate phosphor capable of a high degree of fluorescence.

Other objects of this invention will become obvious to those skilled in the art from that which follows:

DESCRIPTION OF PREFERRED EMBODIMENTS

In accordance with this invention, the above and other objects are attained with novel mixed alkaline earth sulfate compositions which are activated by ions of the lanthanide rare earth series.

The phosphors so prepared by coprecipitation of the activator ion and the plurality of alkaline earth ions in dilute solutions exhibit extraordinary and unexpected properties heretofore sought but not achieved.

In one embodiment, my invention comprises an inorganic phosphor comprising a lanthanide rare earth as an activator, and a mixed crystal of a plurality, i.e., at least two, alkaline earth sulfates.

In another embodiment, my invention comprises a process for producing lanthanide activated mixed alkaline earth sulfate phosphor crystals, which process comprises simultaneously introducing into a reaction solution, another solution comprising lanthanide ions and a plurality of, i.e., at least two, alkaline earth ions and a solution comprising sulfate ions, maintaining in said reaction solution up to about 1 molar concentration of an excess of said sulfate ions over said alkaline earth ions, and preventing local excesses of said alkaline earth ions and sulfate ions in said reaction solution.

In still another embodiment of my invention, there is included a fluorescent screen comprising a support and a layer comprising a crystalline inorganic phosphor of a plurality of mixed alkaline earth sulfates which are lanthanide activated. By use of the term lanthanide it will be understood to mean those rare earth elements which have an atomic number in the range from 58 to 71 and include europium, dysprosium samarium, cerium, thulium, ytterbium and the like. Preferred lanthanides are those that have atomic numbers in the range of 58-63 and 66-70.

The alkaline earth metals whose sulfates comprise one aspect of the present invention when combined in plurality include those of Group 2A of the Periodic Table and are exemplified by strontium, calcium, barium and the like. These alkaline earth metals appear in various combinations of at least two such metals with activators. Typical novel phosphors include those mixed crystalline phosphors such as europium-activated strontium barium sulfate, ytterbium-activated barium strontium sulfate, europium-activated calcium barium sulfate, europium-activated calcium strontium sulfate, dysprosium-activated barium strontium sulfate, thulium-activated barium strontium sulfate, thulium-activated barium calcium sulfate, cerium-activated calcium barium sulfate, samarium-activated barium strontium sulfate, samarium-activated barium calcium sulfate, europium-activated barium strontium calcium sulfate.

By use of the term mixed crystals of said alkaline earth sulfates, it will be understood to mean those phosphor crystals which contain both anion and cations in solid solution and not merely a loose physical mixture of separate crystals of said alkaline earths. However, separate crystals may in fact be present in rather small amounts in my novel mixed crystal phosphors without seriously affecting their fluorescent properties.

The nature of association of the lanthanide-activator ions with the mixed earth sulfate crystal is not entirely understood at this time. In one unexpected aspect of this invention, there is provided trivalent activator lanthanides, such as europium, which comprise the most efficient and desirable phosphors. These differ substantially from those seemingly similar divalent activators known in the art such as are disclosed in French Pat. No. 945,687 issued Nov. 29, 1948 (Fernberger).

In still another aspect of my invention, I have found that certain cations, and particularly those which are univalent, are particularly useful as co-activators along with the trivalent lanthanide activators. For example, alkali metal ions such as lithium, sodium, potassium, cesium, as well as ammonium and the like are particularly effective in obtaining marked increases in fluorescence upon exposure to radiation. The preferred univalent ions are sodium, potassium, and ammonium. These increases can be effected by employing a wide range of concentration of cations in the reaction solution used in preparing the phosphor.

The concentration of the cation in the novel phosphors can vary widely. The most desirable concentrations for a particular combination of cations can be determined by experimentation. The change in concentration will naturally affect the wave length at which the phosphor will fluoresce when excited by x-rays. Europium-activated barium strontium sulfate exhibits best results when the barium is present at a concentration from about 10 mole percent to about 90 mole percent and europium is present at a concentration of from about 0.16 mole percent to about 1.4 mole percent, a preferred concentration of barium being from about 25 mole percent to about 80 mole percent and an especially preferred concentration being 75 mole percent barium.

At the preferred concentrations the europium-activated barium strontium sulfate phosphors are characterized by an intense emission band with a maximum intensity at about 375 nm to about 380 nm and a width of about 25 nm at half the maximum intensity.

The phosphors of the present invention are further characterized by having a solubility in water of less than about 5 g. per liter at 25° C and a substantial proportion of the grains have a size of at least 0.5 micron for optimum speed.

The novel phosphors comprising europium, ytterbium or cerium, mixed alkaline earth sulfates possess the desirable and unique feature of having an intense spectral emission band of extreme intensity in substantially the ultraviolet region with virtually little or no radiation at long wave length, i.e., above 425 nm. The longer wave lengths are generally undesirable when used with low silver radiographic films as discussed in copending application Ser. No. 868,211, filed Oct. 21, 1969 by Luckey and Koller.

The novel phosphors of the present invention can be desirably prepared by two processes. One preferred method involves the firing of a mixture of all the salts at temperatures above 800° C and preferably 1,000° C or even higher. The firing process is well known in the art and is described in British Pat. Nos. 540,252, issued Oct. 10, 1941; 574,494, issued Jan. 8, 1946; and 557,841, issued Dec. 8, 1943.

Still another preferred process for the production of the lanthanide-activated mixed alkaline earth sulfates is through a double run coprecipitation technique, which technique not only allows for greater reproducibility but does not require the degree of purity of the starting materials such as required in the firing process. Thus one is not required to use starting materials, for the preparation of the phosphors, of a greater purity than Reagent Grade.

In a preferred aspect of this invention, these novel phosphors can be prepared by employing an improved modification of the processes set forth in Belgian Pat. No. 703,998 issued Mar. 18, 1968, to Luckey, which relates to coprecipitation processes for preparing activated alkaline earth sulfates. It could not have been expected by the modification of that process of incorporating the plurality of cations set forth herein, and further by adding the co-activators, that, a product which possesses a marked improvement in light intensity and speed could be achieved. The improved process for preparing said phosphors can be summarized briefly as follows:

Separately introducing the sulfate anions and alkaline earth and lanthanide cations, which form the phosphors, into a reaction solution; maintaining in said reaction solution, throughout the reaction, an excess of anions up to about 1 molar; preventing local excesses of anions and cations in the reaction solution; and growing in substantial amounts crystals of the phosphors in said reaction solution to a size of at least 0.5 micron. Typically at least about 40 percent and more generally at least about 50 percent, by weight, of the phosphor is composed of crystals of this size. Suitable lanthanide activator ions, in the desired proportionate concentration may be added to the reaction solution. Phosphors prepared in accordance with this technique are efficiently luminescent as obtained, but if desired, the crystals can be heated or ripened in the supernatant liquid.

In accordance with this invention, the novel phosphors are prepared as described. The rate of addition of the anions and cations each, is preferably less than 0.1, or even less than 0.04 mole per liter of reaction solution per minute. The relative ratios of the alkaline earth cations to each other and the ratio of lanthanide to alkaline earths is adjusted to provide the ratio desired in the final phosphor product.

The sulfate anion and alakaline earth cations added to the reaction solution from separate solutions, may have concentrations up to about 1.5 molar, although these solutions preferably are less concentrated than 1 molar, and particularly less than 0.5 molar. Salts of the anions and cations are advantageously dissolved in solutions. Any salt can be used which does not have a deleterious effect on the phosphor. The alkaline earths are preferably added as salts of halides, perchlorates and acetates. Especially preferred are the chlorides of the alkaline earths. The preferred sulfates are alkali metal sulfates, ammonium sulfate, and especially sulfuric acid. Preferred lanthanide salts are the chlorides and acetates. It should be clearly uderstood that the starting materials are not limited to the above enumerated salts. Many sources of sulfate and alkaline earth are possible, the source being no part of this invention. Large concentrations of nitrate ions should not be introduced into the reaction solution since coprecipitation of this anion reduces luminescence of most of the phosphors prepared in accordance with the invention. Therefore, the reaction is conducted essentially in the absence of any nitrate ion.

The maximum concentration of anions, cations, and activator ions in the solution of reactants added to the reaction solution depends upon the efficiency in preventing local excesses of reactants.

As a general role an excess of sulfate anion is employed during most of the reaction when preparing these phosphors. The dilute concentration of anions and cations in the reaction solution can be maintained in any convenient way, such as, for example, by metering a suitable solvent, and solutions of the anions and cations required to form the phosphors together with the activator ion required, into the reaction solution at a predetermined rate to maintain the desired low concentration of ions throughout the reaction.

The reaction solution should be such as to allow the growth of crystals of the phosphor to above at least 0.5 micron, and preferably above 1 micron. Any suitable reaction solution can be used which allows such growth. Aqueous solutions are preferred; however, various organic solvents can be used, if desired, such as formamide, alcohols such as methanol, ethanol and propanol, dimethyl formamide, acetic acid and the like. The pH of the reaction solution can be varied to provide proper characteristics for the growth of phosphor crystals.

The reaction can be conducted over a relatively wide temperature range. Good results are generally obtained when the reaction solution is within the temperature range of from about 20° to 100° C. Lower temperatures can be employed and may be preferred in the preparation of certain phosphors. Generally, it is advantageous to use temperatures of from 70° to 100° C. Higher temperatures may be employed; such temperatures, however, are not necessary to obtain good results in accordance with the invention. Solutions of anions and cations, as well as solutions of the activator ion and acids or bases to regulate the pH of the reaction solution can if desired be heated prior to introducing such solutions into the reaction solution.

The reaction conditions described above are useful in the formation of the novel inorganic phosphors containing a plurality, i.e., at least 2 alkaline earth cations and sulfate anions, which phosphors have a solubility in water of less than 5 g. per liter at 25° C.

The preferred reaction solution for the preparation of my sulfate phosphors by coprecipitation is an aqueous acidic solution having a pH of up to 2.0. Generally, best results are obtained with acidic solutions having a pH of less than about 1.0 and especially at a pH of about 0.5. The acidity of the reaction solution can be controlled in any convenient manner, such as metering acid or acidic solutions into the reaction solution. A wide variety of acids can be employed to control the pH, such as hydrochloric, hydrobromic, trifluoro acetic, trichloro acetic, dichloro acetic, monochloro difluoro acetic, benzene sulfonic, perchloric and hypophosphorous acids. Moderately good results are obtained with phosphorous, phosphoric and hydroiodic acids. Any acid which tends to quench the fluorescence of the phosphor, such as nitric or sulfamic acid, should not be employed, if the phosphor is not ignited subsequently. These acids can be used, however, if the phosphor is ignited.

With the lanthanide activated sulfate phosphors containing alkaline earth cations in accordance with the practice of the invention, the use of a univalent cation in the reaction mixture in concentration of from about 0.02 to 0.2 molar improves the efficiency of coprecipitation of the lanthanide ion and quenches the tendency toward chemiluminescence in certain phosphors. A preferred univalent cation is ammonium ion but sodium or potassium ions are also highly useful. The lanthanide-activated barium alkaline earth sulfate phosphors which contain potassium ions are improved by ignition. The use of these univalent ions is also desirable in that it quenches chemiluminescence. Still other methods, such as heating to about 200° C, can be used to quench the chemiluminescence.

The intensifying fluorescent screens, which can form part of the radiographic element of my invention, consist essentially of the novel phosphors disclosed above which can be dispersed or suspended in a suitable binder such as those set forth in U.S. Pat. Nos. 3,300,310 and 3,300,311 supra, which employ a water-soluble copolymer of alkylacrylate and acrylic acid, copolymers of vinyl chloride and vinyl acrylate, polyvinyl butyral as set forth in German Pat. No. 1,186,332 issued Jan. 28, 1965, to Patten et al, a coherent film-forming macromolecular polymer binder such as resins, polymers or copolymers of polycarbonate which comprise recurring carbonate units in the polymer chain, and the like. The phosphors can be present in the binder in a wide variety of ratios such as, for example, from about 30:1 to about 4:1 and preferably in the range of about 16:1 to about 6:1. The coverage of the phosphor can vary over a wide range. Effective coverage can be determined through experimentation. A preferred coverage of said phosphor in the screen is in a range from about 15 to about 76 grams/ft$^2$. With respect to general purpose screens good results are achieved with a coverage in the range of about 35 – 55 grams/ft$^2$ and with respect to high definition screens a coverage of from about 15 – 25 grams/ft$^2$ yields good results. Likewise, these screens can be coated in a variety of ways such as directly over the photographic layer or on both sides of a duplitized or single coated element. Intermediate layers, such as stripping layers, protective or overcoat layers, can likewise be employed between or over the X-ray emulsion layer and the intensifying screen. Said layers can comprise hydrophilic colloid material such as gelatin, gelatin derivatives, cellulose esters, alkyl acrylate-containing polymers and the like.

The radiographic elements of my invention employ, in addition to the alkaline earth containing novel phosphor intensifying screen, a suitably supported image recording layer such as one comprising silver halide as disclosed hereinbefore. The radiographic elements and combinations so described can be constructed such that the photographic elements are either separate, i.e., non-integral, or integral, i.e., as a separate distinct layer of an element comprising a silver halide emulsion coated onto a support with the intensifying screen. Said silver halide can be present in a layer or coating such as a single coating or a duplitized or dual coating, one on each side of a support. Suitable supports are those having the properties to permit their ready passage through a rapid automatic processor. Said support should therefore be reasonably flexible and preferably transparent, but able to maintain the dimensional stability and integrity of the various coatings thereon. Typical film supports are cellulose nitrate, cellulose ester, polyvinyl acetal, polystyrene, polyethylene terephthalate, other polyester, and the like. Supports such as cards or paper which are coated with α-olefin polymers, particularly polymers of α-olefin polymers, particularly polymers of α-olefins containing two or more carbon atoms, as exemplified by polyethylene, polypropylene, ethylene-butene copolymers, and the like, give good results. In addition, if desired, said supports can comprise light absorbing materials either within the support itself, on a layer over and/or under said support, or both.

In addition to being suitably incorporated within an extrusion-formed base support, said light absorbing materials can optionally also be present when otherwise incorporated between the silver halide layers of the element. For example, these absorbing materials can be present both in the support and coated over the base support and carried in a suitable layer such as a hydrophilic colloid layer, like gelatin, or water dispersible vinyl polymers or mixtures thereof and the like.

The thickness of said support can vary as is well-known in the art in order to practice effectively our invention.

The silver halide can comprise varying amounts of silver chloride, silver iodide, silver bromide, silver chlorobromide, silver bromoiodide and the like. Particularly good results are obtained with gelatino silver bromoiodide emulsions in which the average grain size of the silver bromoiodide crystals is in the range of about 0.5 to about 5 microns. When a duplitized silver halide coating is employed, the total silver coverage per area unit for both coatings would be less than about 0.080 gram and preferably each such coating would contain less than about 0.040 gram of silver per square decimeter. These layers are applied by means well-known in the art.

The proper transmittance can be obtained in a variety of ways, such as, for example by the incorporation of optically separating barriers, e.g., undercoats which can be positioned between the silver halide-containing layers, by altering the composition of said layers by including dyes or other materials, by adjusting the halide balance or by modification of silver halide grain shape, size distribution and the like.

The photographic coatings and emulsions described herein can be chemically sensitized with compounds of the sulfur group, noble metal salts such as gold salts, reduction-sensitized with reducing agents, and combinations of these. Furthermore, emulsion layers and other layers present in photographic elements comprising the novel phosphors in the radiographic elements and combinations made according to this invention can be hardened with any suitable hardener or combinations such as aldehyde hardeners, aziridine hardeners, hardeners which are derivatives of dioxane, vinyl sulfones, oxypolysaccharides such as oxystarch, oxy plant gums, inorganic hardeners such as chromium salts, and the like.

The silver halide coatings of the radiographic element useful in this invention can contain any of the hydrophilic, water-permeable binding materials suitable for this purpose. Suitable materials include gelatin, colloidal albumin, polyvinyl compounds, cellulose derivatives, acrylamide polymers and the like, alone or in combination and mixtures. The binding agents for the emulsion layer of the photographic element can also contain dispersed polymerized vinyl compounds. Certain of such compounds are disclosed, for example, in U.S. Pat. Nos. 3,142,568 of Nottorf issued July 28, 1964; 3,193,386 of White issued July 6, 1965; 3,062,672 of Houck et al issued Nov. 6, 1962; and 3,220,844 of Houck et al issued Nov. 30, 1965; and include the water-insoluble polymers and latex copolymers of alkyl acrylates and methacrylates, acrylic acid sulfoalkyl acrylates or methacrylates and the like.

In addition, the radiographic combinations and image-forming elements useful in practicing this invention can also contain fogged internal image, silver halide emulsions as described in U.S. Pat. Nos. 3,397,987 issued May 20, 1968, to Luckey et al, 2,996,382 issued Aug. 15, 1961, to Luckey et al, and 3,178,282 issued Apr. 13, 1965, to Luckey et al. They can also contain silver halides deposited by vacuum as disclosed in U.S. Pat. No. 3,316,096 issued Apr. 25, 1967 to Rasch et al.

The photographic silver halide coatings can also contain additional additives, particularly those known to be beneficial in photographic emulsions. For example, they can contain speed-increasing compounds, for example, "onium" salts, such as quaternary ammonium or ternary sulfonium salts, polyalkylene glycols, thioethers and the like. The photographic silver halide coatings can be stabilized with mercury compounds, azaindenes, quaternary benzothiazolium compounds, hydroxy substituted aromatic compounds, and the like.

The photographic silver halide emulsions or coatings used in combination with screens comprising my novel phosphors can also contain non-ionic, anionic and/or amphoteric coating aids. Some useful coating aids include, for example, saponin, alkyl substituted aryl oxy alkylene ethyl sulfonates of the type described in U.S. Pat. No. 2,600,831 issued June 17, 1952, maleopimarates of the type described in U.S. Pat. No. 2,823,123, issued Feb. 11, 1958, taurine derivatives of the type described in U.S. Pat. No. 2,739,891 issued on Mar. 27, 1956, and alkyl aminopropionates of the type described in U.S. Pat. No. 3,133,816 issued May 19, 1964. Typical of still other good coating aids and surfactants which can be employed in the emulsions used with the screens of this invention include the alkylphenoxy poly(hydroxyalkylene oxides) such as alkylphenoxy poly(glycidols) having from about 5 to about 12 glycidol units, for example, such as those disclosed in British Pat. No. 1,022,878 issued Mar. 16, 1966, to Olin Mathieson. The emulsions and radiographic combinations used and described herein can contain incorporated developing agents such as polyhydroxy benzenes, aminophenols, and 1,3-pyrazolidones. The photographic emulsions can also contain spectral sensitizers such as cyanines, merocyanines, complex (trinuclear) cyanines and complex (tri-nuclear) merocyanines, styryls and hemicyanines.

The photographic silver halide elements which are part of the radiographic combinations described herein provide very good results in image sharpness without need for any dyes or other light absorbing materials. While there is no need for employing dyes or other light absorbing materials in either the film, the screen, or both, extraordinary results can be obtained by using such dyes and light absorbing materials. Where used, absorbing dyes can be in the emulsion layer or in an auxiliary layer such as a layer coated between the support and the emulsion layer, or the absorbing dyes can be included in both the emulsion and the auxiliary layer. These elements can also contain inert particles such as those often employed as matting agents in photographic elements. Suitable materials of this type include, for example, particles of silicon dioxide, glass, starch, polymethyl methacrylate and the like. Such inert particles are often included in an emulsion layer alone and in combination.

These elements can likewise contain various protective overcoats such as those which comprise colloidal silica in an overcoat comprising gelatin and at least another hydrophilic colloid, including gelatin-compatible acrylic polymers which improve various physical characteristics and optical clarity.

A suitable process for radiographically recording images employing said combinations comprises exposing an element comprising silver halide, capable of producing a negative image, said silver halide being present in a total concentration of less than about 0.080 gram of silver per square decimeter, and a fluorescent intensifying screen comprising a mixed alkaline earth sulfate having its spectral emission at about 375 nm to about 380 nm to high energy x-rays.

Processing can be effected in a variety of ways including the multi-tank manual methods but preferably in a unidirectional, multi-roller high speed processing apparatus described in Belgian Pat. No. 700,301 issued Aug. 31, 1967, to Barnes et al. These processes can be effected and the combinations of this invention can be processed respectively according to U.S. Pat. No. 3,232,761 issued Feb. 1, 1966, to Allen and Burness.

The silver-containing film-screen combinations of my invention can likewise be used with unexpectedly good radiographic results in solvent transfer systems such as where single and duplitized coatings are employed. In addition where positive images are so obtained they are easily converted to negative microfilm images either during or after processing. Equally good results are obtained when these novel combinations contain color couplers, such as those described in British Pat. No. 799,588 issued Aug. 13, 1958, to Whitmore and Elins, and by using these novel combinations and processes in color film-containing systems and by employing the elements described in co-filed Application Ser. No. 868,222, filed Oct. 21, 1969, now abandoned of coworker M. Cleare entitled "Radiographic Elements and Products." Said elements comprise a non-color imparting ultraviolet absorbing material placed in or on the base support used in combination with a substantially ultraviolet or near ultraviolet emitting phosphor containing intensifying screen.

As a result of our novel phosphors and screens containing them, radiographic combinations are used effectively in recording x-ray images, and I have unexpectedly provided the art with film elements having improved sharpness, and with vastly increased speed.

The following examples are intended for a further understanding and description of my invention:

EXAMPLE 1

A 3 molar stock solution of Reagent Grade strontium chloride is prepared by mixing 1,599.8 grams of strontium chloride hexahydrate with sufficient distilled water to make 2 liters of solution. The following stock solutions in water are prepared: a 1.35 molar solution of barium chloride, a 3 molar solution of sulfuric acid, a 0.4 molar solution of europium triacetate, and a 3 molar solution of ammonium chloride in water. These solutions and others used in the examples that follow are prepared in the manner similar to that described in Belgian Pat. No. 703,998 issued Mar. 18, 1968 and as modified herein. In this example, and those that follow the materials are taken from the prepared stock solutions. In those examples where HCl is used, the HCl is 37.5% Reagent Grade.

A solution (A) is prepared by mixing 208 ml. of the strontium chloride solution, 463 ml. of the barium chloride solution, and 15 ml. of the europium triacetate solution with sufficient distilled water to make 5 liters. Another solution (B) is prepared by mixing 417 ml. of the sulfuric acid solution, and 300 m. of the ammonium chloride solution with sufficient distilled water to make 5 liters. A third solution (C) is prepared by mixing 120 ml. of the ammonium chloride solution, and 50 ml. of the sulfuric acid solution with sufficient water to make 4 liters.

Solution (C) is placed in a 22-liter round bottom flask with fluted sides and heated to 95° C. Solutions (B) and (A) are heated to 70° C to solution (C) is added 70 ml. of hydrochloric acid. Solutions (A) and (B) are simultaneously added to solution (C) each at the rate of 83 ml. per minute. Solution (C) is vigorously stirred during the addition of solutions (A) and (B) with a 2 inch glass stirrer, rotating at 2,000 r.p.m. about an inch from the bottom of the flask.

At the conclusion of the addition of solutions (A) and (B) to solution (C) the precipitate is collected and washed four times by decantation with distilled water and then dried in air at room temperature.

The precipitate is placed in a cup at a coverage of 0.6 gram per square centimeter and is exposed at 70 kvp. x-rays, filtered by 1/2 mm of copper and 1 mm. of aluminum. The fluorescence is measured with an x-ray film comprising a cellulose triacetate support having coated on one side thereof a gelatin containing nonspectrally sensitized coarse grained silver bromoiodide (2 mole percent I) emulsion. The film is developed in Kodak developer D-19b for 5 minutes at 68° F. The developed density produced by the emitted radiation from the phosphor is compared with that produced by a similar sample of commercial lead-activated barium sulfate. The speed of the lead-activated barium sulfate is set equal to 100. Thus, for example, a speed of 50 for the new phosphor would mean that during irradiation with x-rays it produced half the intensity that is produced by the commercial lead-activated barium sulfate. When the novel precipitate is compared with lead-activated barium sulfate in this manner, the speed is 214.

Microscopic examination for the crystals of this precipitate show that most of the crystals are smaller than 10 microns in cross section. No chemiluminescence is observed when the precipitate is stored for 48 hours in contact with a film similar to that described in the preceding paragraph. The emission spectrum of this phosphor is excited by 40 kvp. x-rays and measured with a Beckman DK-2A spectrophotometer. The maximum emission appears at 380 nm.; the width of the emission band at half the maximum intensity is 25 nm.

EXAMPLE 2

A solution (A) is prepared by mixing 208 ml. of the strontium chloride solution, 460 ml. of the barium chloride solution, and 5 ml. of the europium triacetate solution with sufficient distilled water to make 5 liters. Solution (B) is prepared by mixing 417 ml. of the sulfuric acid solution and 300 ml. of the ammonium chloride solution with sufficient distilled water to make 5 liters. Solution (C) is prepared by mixing 120 ml. of the ammonium chloride solution and 50 ml. of the sulfuric acid solution with sufficient distilled water to make 4 liters.

Solution (C) is placed in a 22-liter round bottom flask with fluted sides and heated to 95° C. Solutions (A) and (B) are heated to 70° C to solution (C) is added 70 ml. of hydrochloric acid. Solutions (A) and (B) are added simultaneously to solution (C) at a rate of 83 ml. each per minute. Solution (C) is stirred vigorously during the addition as described in Example 1.

The precipitate is collected and washed with distilled water as described in Example 1 and dried in air at room temperature.

The speed of the precipitate is measured as described in Example 1. The speed, compared with 100 for commercial lead-activated barium sulfate, is 210. The high speed is obtained with less than 0.16 mole percent europium in the phosphor.

EXAMPLE 3

Solution (A) is prepared by mixing 695 ml. of the barium chloride solution, 104 ml. of the strontium chloride solution and 15 ml. of the europium triacetate solution with sufficient distilled water to make 5 liters. Solution (B) is prepared by mixing 417 ml. of the sulfuric acid solution and 300 ml. of 3 molar Reagent Grade sodium chloride solution with sufficient distilled water to make 5 liters. Solution (C) is prepared by mixing the 120 ml. of 3 molar sodium chloride solution and 50 ml. of the sulfuric acid solution with sufficient distilled water to make 4 liters.

Solution (C) is placed in a 22-liter round bottom flask with fluted sides and heated to 95° C. Solution (A) and (B) are heated to 70° C. To solution (C) is added 70 ml. of hydrochloric acid. Solutions (A) and (B) are simultaneously added at the rate of 83 ml. per minute to solution (C). Solution (C) is vigorously stirred throughout the addition of solutions (A) and (B). The precipitate is washed as described in Example 1, collected and dried in air at room temperature. The speed of the precipitate is measured as is described in Example 1. As compared with 100 for the commercial lead-activated barium sulfate our novel phosphor shows a speed of 235. This example shows that sodium chloride may be substituted for ammonium chloride without effecting the unusually high speed which these novel phosphors produce.

EXAMPLE 4

Solution (A) is prepared by mixing 200 ml. of the strontium chloride solution, 460 ml. of the barium chloride solution and 10 ml. of 0.4 molar ytterbium chloride solution with sufficient distilled water to make 5 liters. The ytterbium chloride solution is prepared by mixing 99.9% ytterbium chloride with sufficient distilled water, followed by filtration. Solution (B) is prepared by mixing 417 ml. of the sulfuric acid solution with sufficient water to make 5 liters. Solution (C) is prepared by mixing 50 ml. of the sulfuric acid solution with sufficient water to 4 liters.

Solution (C) is placed in a 22 round bottom flask with fluted sides and heated to 95° C. Solution (A) and (B) are heated to 70° C. 80 ml. of hydrochloric acid is added to solution (C). Solutions (A) and (B) are simultaneously added to solution (C) each at the rate of 83 ml. per minute. Solution (C) is subjected to vigorous stirring as described in Example 1, throughout the addition. The precipitate is collected and dried as described in Example 1. The speed of the novel phosphor measured as in Example 1 is 92 as compared with 100 for commercial lead-activated barium sulfate. The speed of ytterbium-activated barium sulfate phosphors made in the same manner as our novel phosphors is 54 as compared with 100 for commercial lead-activated barium sulfate. The ytterbium-activated barium strontium sulfate showed no chemiluminescence. The maximum emission is at 378 nm. The width of the emission band at half the maximum intensity is 25 nm.

EXAMPLE 5

Solution (A) is prepared by mixing 417 ml. of the strontium chloride solution and 15 ml. of the europium triacetate solution with sufficient distilled water to make 5 liters. Solution (B) is prepared by mixing 417 ml. of the sulfuric acid solution and 300 ml. of the ammonium chloride solution with sufficient distilled water to make 5 liters. Solution (C) is prepared by mixing 120 ml. of the ammonium chloride solution and 50 ml. of the sulfuric acid solution with sufficient distilled water to make 4 liters.

Solution (C) is placed in a 22-liter flask and heated to 95° C. Solutions (A) and (B) are heated to 70° C. 70 ml. of hydrochloric acid is added to solution (C). Solutions (A) and (B) are simultaneously added to solution (C) each at the rate of 83 ml. per minute while subjecting solution (C) to vigorous agitation. The precipitate is collected, washed and dried. The speed of the precipitate is measured as in Example 1. As compared with 100 for the commercial lead-activated barium sulfate, this phosphor showed the speed of 175.

EXAMPLE 6

Solution (A) is prepared as described in Example 5. Solution (B) is prepared by mixing 417 ml. of the sulfuric acid solution and 300 ml. of a filtered 3 molar solution of Reagent Grade sodium chloride in distilled water with sufficient water to make 5 liters. Solution (C) is prepared by mixing 120 ml. of the sodium chloride solution and 50 ml. of the 3 molar sulfuric acid with sufficient distilled water to make 4 liters.

Solution (C) is placed in a 22 meter flask and heated to 95° C. Solutions (B) and (A) are heated to 70° C. 70 ml. of hydrochloric acid is added to solution (C). Solutions (A) and (B) are simultaneously added to solution (C) each at the rate of 83 ml. per minute while subjecting solution (C) to vigorous stirring. The precipitate is washed, collected and dried. The speed of this phosphor as compared with 100 for commercial-lead activated barium sulfate is 152.

Examples 1 – 3 as compared with Examples 5 and 6 illustrate that our novel phosphors containing at least two alkaline earth sulfates are faster than a lanthanide activated alkaline earth sulfate comprising only one alkaline earth which is in turn faster than the commercial-lead activated barium sulfate.

EXAMPLE 7

A stock solution of 3 molar Reagent Grade calcium chloride is prepared by mixing 882 grams of calcium chloride dihydrate with sufficient distilled water to make 2 liters. The stock solutions of barium chloride, sulfuric acid, europium trichloride and sodium chloride are prepared as described in Example 1.

Several phosphors are prepared in the manner as described in Example 1, but 80 ml. of hydrochloric acid are added to Solution C instead of 70 ml. The volume of salts and the speed of the precipitate are summarized in Table I. This example shows that the addition of calcium ions to europium-activated barium sulfate results in a reduction of the speed when such phosphors are coactivated with ammonium chloride, but results in an increase in speed when the phosphor is coactivated with sodium chloride. When the mole percent of calcium ion is between 0 and 25 the speed of the phosphor is superior to that phosphor comprising only one alkaline earth.

TABLE I

| Run | Soln. A | Soln. B | Soln. C | Speed[1] |
|---|---|---|---|---|
| (a) | 695 ml. 1.35M $BaCl_2$, 104 ml. 3M $CaCl_2$, 15 ml. .4M $Eu(OAc)_3$, 6.25 ml. HCl | 417 ml. 3M $H_2SO_4$, 300 ml. 3M $NH_4Cl$. | 120 ml. 3M $NH_4Cl$, 50 ml. 3M $H_2SO_4$. | 90 |
| (b) | Same as above | 417 ml. 3M $H_2SO_4$, 300 ml. 3M NaCl. | 120 ml. 3M NaCl, 50 ml. 3M $H_2SO_4$. | 140 |
| (c) | 833 ml. 1.35M $BaCl_2$, 41.7 ml. 3M $CaCl_2$, 15 ml. .4M $Eu(OAc)_3$, 6.25 ml. HCl | 417 ml. 3M $H_2SO_4$, 300 ml. 3M NaCl. | 120 ml. 3M NaCl, 50 ml. 3M $H_2SO_4$. | 165 |
| (d) | Same as above | 417 ml. 3M $H_2SO_4$, 300 ml. 3M NaCl. | 120 ml. 3M $NH_4Cl$, 50 ml. 3M $H_2SO_4$. | 110 |
| (e) | 927 ml. 1.35M $BaCl_2$, 15 ml. .4M $Eu(OAc)_3$, 6.25 ml. HCl | 417 ml. 3M $H_2SO_4$, 300 ml. 3M $NH_4Cl$. | 120 ml. 3M $NH_4Cl$, 50 ml. 3M $H_2SO_4$. | 155 |
| (f) | 927 ml. 1.35M $BaCl_2$, 15 ml. .4M $Eu(OAc)_3$, 6.25 ml. HCl | 417 ml. 3M $H_2SO_4$, 300 ml. 3M NaCl. | 120 ml. 3M NaCl, 50 ml. 3M $H_2SO_4$. | 145 |

[1] Based on 100 for a commercial lead-activated barium sulfate phosphor.

EXAMPLE 8

Phosphors are prepared in the manner as described in Example 1, but 80 ml. of hydrochloric acid are added to Solution C instead of 70 ml. The volume of materials and the speed of the resulting phosphors are summarized in Table II. This example shows that the europium activated barium strontium sulfate coactivated with ammonium chloride is superior to the europium activated strontium sulfate coactivated with ammonium chloride. The example also shows the addition of calcium ions to the europium activated strontium sulfate results in a slight decrease in the speed of the phosphor.

TABLE II[*]

| Run | Soln. A | Soln. B | Soln. C | Speed[1] |
|---|---|---|---|---|
| (a) | 417 ml. 3M $SrCl_2$, 15 ml. 0.4M Eu $(OAc)_3$, 6.25 ml. HCl | 417 ml. 3M $H_2SO_4$, 300 ml. 3M $NH_4Cl$. | 120 ml. 3M $NH_4Cl$, 50 ml. 3M $H_2SO_4$. | 190 |
| (b) | 104 ml. 3M $CaCl_2$, 312 ml. 3M $SrCl_2$, 15 ml. 0.4M Eu $(OAc)_3$, 6.25 ml. HCl | Same as above | Same as above | 170 |
| (c) | 231 ml. 1.35M $BaCl_2$, 312 ml. 3M $SrCl_2$, 15 ml. 0.4M Eu $(OAc)_3$, 6.25 ml. HCl | do | do | 250 |

[*] The salts are taken from the prepared stock solutions of Example 1.
[1] Based on 100 for a commercial lead-activated barium sulfate phosphor.

EXAMPLE 9

The solutions and precipitate are prepared in the manner as described in Example 1, but 80 ml. of hydrochloric acid are added to Solution C instead of 70 ml. The volumes of material and the speeds of the resulting phosphors are described in Table III. This example shows that the barium, calcium and strontium sulfate precipitates are not appreciably fluorescent until activated with lanthanide ions.

TABLE III

| Run | Soln. A | Soln. B | Soln. C | Speed[1] |
|---|---|---|---|---|
| (a) | 927 ml. 1.35M BaCl$_2$, 6.25 ml. HCl. | 417 ml. 3M H$_2$SO$_4$, 400 ml. 3M NH$_4$Cl. | 50 ml. 3M H$_2$SO$_4$, 160 ml. 3M NH$_4$Cl. | 1 |
| (b) | 417 ml. 3M SrCl$_2$, 6.25 ml. HCl. | Same as above | Same as above | 1 |
| (c) | 695 ml. 1.35M BaCl$_2$, 104 ml. 3M SrCl$_2$, 6.25 ml. HCl. | do | do | 1 |
| (d) | 695 ml. 1.35M BaCl$_2$, 104 ml. 3M SrCl$_2$, 15 ml. 0.4M Eu(OAc)$_3$, 6.25 ml. HCl. | 417 ml. 3M H$_2$SO$_4$, 400 ml. 3M NH$_4$Cl. | 50 ml. 3M H$_2$SO$_4$, 160 ml. 3M NH$_4$Cl. | 187 |

[1] Based on 100 for a commercial lead-activated barium sulfate phosphor.

EXAMPLE 10

The solutions and precipitates are prepared in the same manner as described in Example 1, but 80 ml. of hydrochloric acid are added to Solution C instead of 70 ml. The volume of materials and the speed of the resulting precipitates are summarized in Table IV. The examples show that the addition of strontium ion to a dysprosium-activated barium sulfate, which has been coactivated with ammonium chloride, results in an increase of the speed. It was also found that the addition of calcium ions would also cause an increase in the speed of those phosphors which are coactivated with sodium ions.

TABLE IV

| Run | Soln. A | Soln. B | Soln. C | Speed[1] of phosphor* |
|---|---|---|---|---|
| (a) | 927 ml. 1.35M BaCl$_2$, 15 ml. .4M DyCl$_3$, 6.25 ml. HCl. | 417 ml. 3M H$_2$SO$_4$, 300 ml. 3M NH$_4$Cl. | 50 ml. 3M H$_2$SO$_4$, 120 ml. 3M NH$_4$Cl. | 52 |
| (b) | 208 ml. 3M SrCl$_2$, 463 ml. 1.35M BaCl$_2$, 15 ml. .4M DyCl$_3$, 6.25 ml. HCl. | Same as above | Same as above | 67 |
| (c) | 695 ml. 1.35M BaCl$_2$, 104 ml. 3M SrCl$_2$, 6.25 ml. HCl, 15 ml. .4M DyCl$_3$. | do | do | 69 |

[1] Based on 100 for a commercial lead-activated barium sulfate phosphor.
*When measured with a film sensitive to radiation at 478 and 572 nm.

EXAMPLE 11

The solutions and precipitates are prepared in the same manner as described in Example 1, but 80 ml. of hydrochloric acid are added to Solution C instead of 70 ml. The resulting phosphors are measured in the same manner as described in Example 1. The volume of materials and the speeds of the resulting phosphors are summarized in Table V.

TABLE V

| Run | Soln. A | Soln. B | Soln. C | Speed[2] |
|---|---|---|---|---|
| (a) | 927 ml. 1.35M BaCl$_2$, 15 ml. .4M GdCl$_3$.[1] | 417 ml. 3M H$_2$SO$_4$, 300 ml. 3M NH$_4$Cl. | 50 ml. 3M H$_2$SO$_4$, 120 ml. 3M NH$_4$Cl. | 13 |
| (b) | 695 ml. 1.35M BaCl$_2$, 104 ml. 3M SrCl$_2$, 15 ml. .4M GdCl$_3$. | Same as above | Same as above | 9 |
| (c) | 927 ml. 1.35M BaCl$_2$, 45 ml. .4M GdCl$_3$. | 417 ml. 3M H$_2$SO$_4$, 500 ml. 3M NH$_4$Cl. | 50 ml. 3M H$_2$SO$_4$, 200 ml. 3M NH$_4$Cl. | 25 |
| (d) | 927 ml. 1.35M BaCl$_2$, 45 ml. .4M GdCl$_3$. | 417 ml. 3M H$_2$SO$_4$, 500 ml. 3M NH$_4$Cl. | 50 ml. 3M H$_2$SO$_4$, 200 ml. 3M NH$_4$Cl. | 19 |

[1] From a 0.4 M solution, prepared as in Example.
[2] Based on 100 for a commercial lead-activated barium sulfate phosphor.

The results of the examples as summarized in Tables I–V illustrate that the particular lanthanide selected to be used in combination with mixed alkaline earths can have a significant effect upon the speed of the phosphor. The phosphors of Table I–III and V, however, show the very desirable property of an emission band in the U.V. region of the spectrum.

EXAMPLE 12

The solutions and precipitates are prepared as described in Example 1, but 80 ml of hydrochloric acid are added to Solution C instead of 70 ml. The resulting phosphors are measured in the same manner as described in Example 1. The volumes of materials and the speeds of the resulting phosphors are summarized in Table VI.

This example shows that a samarium activated mixed alkaline earth sulfate phosphor is superior to a samarium activated monoalkaline earth sulfate which is in turn superior to the commercial lead activated barium sulfate.

TABLE VI

| Run | Soln. A | Soln. B | Soln. C | Speed[3] |
|---|---|---|---|---|
| (a) | 20 ml. SmCl$_3$,[1] 927 ml. 1.35M BaCl$_2$, 6.25 ml. HCl. | 417 ml. 3M H$_2$SO$_4$, 300 ml. 3M NaCl. | 50 ml. 3M H$_2$SO$_4$, 120 ml. 3M NH$_4$Cl. | [2] 165 |
| (b) | 695 ml. 1.35M BaCl$_2$, 20 ml. SmCl$_3$,[1] 104 ml. 3M SrCl$_2$, 6.25 ml. HCl. | Same as above | Same as above | 240 |
| (c) | 695 ml. 1.35M BaCl$_2$, 20 ml. SmCl$_3$,[1] 104 ml. 3M CaCl$_2$, 6.25 ml. HCl. | do | do | 190 |

[1] From a 0.3 M SmCl$_3$ solution.
[2] The film was sensitive to radiation of 690 nm.
[3] Based on 100 for a lead-activated barium sulfate phosphor.

EXAMPLE 13

This example compares fired europium activated barium strontium sulfate with fired europium activated barium sulfate.

Barium sulfate powder is prepared by the double-run precipitation process described in copending application Ser. No. 614,151 filed Feb. 6, 1967.

A solution (A) is prepared by mixing 417 ml of 3 M strontium chloride with distilled water to make 5 liters. A solution (B) is prepared by mixing 834 ml of 1.5 M. sodium sulfate solution with distilled water to make 5 liters. A solution (C) is prepared by mixing 400 ml of the 1.5M sodium sulfate solution with distilled water to make 4 liters.

Solution (C) is heated to 95° C. Solutions (A) and (B) are heated to 75° C and simultaneously added to solution (C) at a rate of 83 ml of each per minute while vigorously stirring solution (C). The strontium sulfate precipitate is washed and dried at room temperature.

The prepared powders of barium sulfate and strontium sulfate and Reagent Grade sodium sulfate are thoroughly blended and europium trichloride is slowly added with stirring. The mixture is heated to 1,100° C for one hour. The results are described in Table VII.

TABLE VII.—SAMPLE NUMBER V

| | BaSO$_4$, g. | SrSO$_4$, g. | Na$_2$SO$_4$, g. | 0.4 M EuCl$_3$, ml. | Time of heating, hours | Measured speed[1] |
|---|---|---|---|---|---|---|
| (a) | 93.3 | | 5 | 5 | 1 | 125 |
| (b) | 70 | 18.3 | 5 | 5 | 1 | 195 |

[1] Based on 100 for a commercial-lead activated barium sulfate phosphor.

The results show that a fired europium-activated mixed alkaline earth sulfate is superior to lead activated barium sulfate and to a fired europium-activated barium sulfate.

The maximum emission of sample 2 is at 380 nm.

An unexpected property of our fired phosphor found in addition to the superior speed is the superior stability under irradiation with x-rays as compared with commercial lead-activated barium sulfate.

In similar fashion thulium activated phosphors produced good speed and substantially no chemiluminescence.

The europium-activated barium strontium sulfate phosphor is less sensitive to fluctuations in temperature than europium-activated barium sulfate, lead-activated barium sulfate or calcium tungstate, in the region of those temperatures normally used in radiography.

While the speeds of the lanthanide-activated phosphors co-activated with ammonium ion decrease when heated to 1,000° C in air, the speeds of the phosphors co-activated with sodium ion or potassium ion remain at least the same or increase when heated to 1,000° C. In the case of europium-activated barium sulfate with coprecipitated strontium sulfate, the percentage increase in speed on ignition is greatest when the phosphor contains potassium or when the concentration of europium is less than 0.5 mole percent.

The lattice spacing (630 plane) of europium-activated barium sulfate, coactivated with ammonium ion, is 1.477, whereas the lattice spacing of a similar phosphor which additionally contains 25 mole percent strontium ion is 1.402. The speed for the former phosphor is 170 whereas the speed for the latter is 210 based on 100 for the well known commercial lead activated barium sulfate. Thus, my novel phosphors have different lattice spacing than prior art phosphors.

The nature and concentration of the coactivator, such as the monovalent coactivators like ammonium and sodium ions, and the alkaline earths in the lanthanide-activated alkaline earth sulfates have a strong and beneficial influence on the efficiency of the luminescence. I have also found that when the alkali metal or ammonium cations of the novel europium-activated phosphors of the present invention are omitted, strong chemiluminescence may be undesirably obtained, whereas those same phosphors prepared in the presence of the coactivator ions do not show chemiluminescence.

The novel phosphors are not only useful in medical and industrial radiography, but can also be used in cathode ray tubes, black lights, fluorescent lamps and the like.

The invention has been described in detail with particular reference with certain embodiments thereof, but it will be understood that variations and modifications can be effected within the spirit and scope of the invention.

I claim:

1. A fluorescent screen comprising a support and a layer including a mixed crystalline phosphor of europium-activated barium strontium sulfate wherein based on the cation content of the phosphor composition barium is present in a range from about 10 mole percent to about 90 mole percent and europium is present in a range from about 0.16 mole percent to about 1.4 mole percent.

2. The fluorescent screen of claim 1 in which barium comprises about 75 mole percent of the cation content of the phosphor composition.

3. A radiographic element comprising in integral or nonintegral combination a supported image-recording layer and a supported screen layer including a mixed crystalline phosphor of europium-activated barium strontium sulfate wherein based on the cation content of the phosphor composition barium is present in a range from about 10 mole percent to about 90 mole percent and europium is present in a range from about 0.16 mole percent to about 1.4 mole percent.

4. The radiographic element of claim 3 in which barium comprises about 75 mole percent of the cation content of the phosphor composition.

* * * * *